(12) United States Patent
Cluse et al.

(10) Patent No.: US 7,756,767 B2
(45) Date of Patent: Jul. 13, 2010

(54) SYSTEM AND METHOD FOR RENEGOTIATING A FINANCIAL INSTRUMENT

(75) Inventors: Toni S. Cluse, Sagamore Hills, OH (US); Jeffrey J. Scheidler, Stow, OH (US); David E. Williams, Cleveland Heights, OH (US)

(73) Assignee: Keycorp, Cleveland, OH (US)

( * ) Notice: Subject to any disclaimer, the term of this patent is extended or adjusted under 35 U.S.C. 154(b) by 1300 days.

(21) Appl. No.: 10/762,112

(22) Filed: Jan. 21, 2004

(65) Prior Publication Data
US 2005/0160019 A1 Jul. 21, 2005

(51) Int. Cl.
G06Q 40/00 (2006.01)
(52) U.S. Cl. ........................................ 705/36 R; 705/37
(58) Field of Classification Search ..................... 705/36
See application file for complete search history.

(56) References Cited

U.S. PATENT DOCUMENTS

| | | | |
|---|---|---|---|
| 4,774,664 | A | 9/1988 | Campbell et al. |
| 5,742,775 | A | 4/1998 | King |
| 5,832,461 | A | 11/1998 | Leon et al. |
| 6,023,684 | A | 2/2000 | Pearson |
| 6,105,007 | A | 8/2000 | Norris |
| 6,131,810 | A | 10/2000 | Weiss et al. |
| 6,263,321 | B1 | 7/2001 | Daughtery, III |
| 6,354,490 | B1 * | 3/2002 | Weiss et al. .................. 235/379 |
| 6,374,231 | B1 | 4/2002 | Bent et al. |
| 7,039,600 | B1 * | 5/2006 | Meek et al. .................... 705/14 |
| 7,197,478 | B2 * | 3/2007 | Kargman ..................... 705/26 |
| 2002/0002530 | A1 * | 1/2002 | May ........................... 705/37 |
| 2002/0069150 | A1 | 6/2002 | Ni |
| 2002/0091651 | A1 * | 7/2002 | Petrogiannis et al. ......... 705/76 |

(Continued)

OTHER PUBLICATIONS

"Maturity Notice." AIG Technology. Oct. 17, 2002. Dec. 17, 2007 <www.aigtechnology.com/images/wm/maturity_main-1.pdf>.*

Primary Examiner—Stefanos Karmis
Assistant Examiner—Jessica L Lemieux
(74) Attorney, Agent, or Firm—Thompson Hine LLP

(57) ABSTRACT

A method for renegotiating a financial instrument includes the steps of initiating a logical session between a client program and a client interface affiliated with a financial institution, displaying financial information relating to a client on the client interface, displaying a message on the client program that a financial instrument of the client may be renegotiated, transmitting a request to renegotiate the financial instrument to the client interface, displaying a disclosure document pertaining to the request to renegotiate, and if the client agrees to accept terms of the disclosure document, displaying a plurality of renegotiation options to the client on the client program, and transmitting a selection of one of the renegotiation options to the client interface. The system for renegotiating the financial instrument is structured to operate over a network and includes a client interface program affiliated with a financial institution, an application server housing the client interface program and the client interface program being capable of retrieving data from a data repository that a financial instrument of the client may be renegotiated and displaying a message on a display device indicating that the financial instrument may be renegotiated. Although the method and system of the present invention maybe applied to a wide variety of financial instruments, in a preferred embodiment, the financial instrument is a certificate of deposit.

39 Claims, 22 Drawing Sheets

U.S. PATENT DOCUMENTS

2002/0138389 A1     9/2002  Martone et al.
2002/0188483 A1*   12/2002  Fisher .......................... 705/4
2002/0194094 A1    12/2002  Lancaster et al.
2002/0194120 A1    12/2002  Russell et al.
2003/0009403 A1     1/2003  Sapp
2004/0010628 A1*    1/2004  Gillam et al. ............... 709/250

* cited by examiner

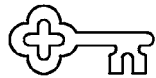 Online Banking and Investing

*Sign On*
_____
*1-800-555-1212*

Please enter your User ID. If you have not created an Online Banking and Investing User ID, your Social Security Number (or Tax ID Number, for businesses) is your default User ID. You can create a User ID from the Self Service section within Online Banking and Investing.

User ID:   64 ⌐[_____]   <u>FORGOT YOUR USER ID ?</u>

Please enter your Online Banking and Investing password, which you entered at the end of the enrollment process. This is also the password that you use today when getting account information or paying bills via 1-800-555-1212, our telephone inquiry system.

Password:   [_____]  <u>FORGOT YOUR PASSWORD ?</u>
              66                              <u>62</u>

68 ⌐[ SUBMIT ] [ CANCEL ]

| Important Announcements |
|---|
| Did you know that your bill payments are guaranteed? If properly scheduled, we guarantee that payments will be received within 5 business days. If the payee doesn't receive the payment within that time frame, Key will rebate any late fees. |

FIG. 3

Online Banking and Investing

| HOME | SITE MAP | EXIT |
|---|---|---|
| HELP | PREFERENCES | CONTACT US |

▶ ACCOUNTS & TRANSACTIONS  ▶ INVESTMENT RESEARCH  ▶ SELF SERVICE

Accounts & Transactions > Account Summary

Account Summary  _74_   [ CUSTOMIZE THIS VIEW ]

*Select an account name to view transactions and other information.*

Deposit Accounts

| Account | Number | Balance | Available Bal | Effective Date |
|---|---|---|---|---|
| Key Choice Checking | 123456789012 | 2,300.45 | 2,300.45 | 10/05/2001 |
| Key Money Market Savings | 123456789 | 23.66 | 23.66 | 10/05/2001 |
| Passbook Savings | 123456789 | 493.55 | 493.55 | 10/05/2001 |
| Key Certificate of Deposit | 123456789 | 4,000.00 | 4,000.00 | 10/05/2001 |
| Total: _86_ | | 6,817.66 | | |

Credit Card / Line of Credit Accounts

| Account | Number | Balance | Effective Date |
|---|---|---|---|
| Credit Card | 1234567890123456 | 400.00 | 10/05/2001 |
| Cash Reserve Credit | 123456789012 | 3,230.39 | 10/05/2001 |
| Key Equity Options | 12345678901234 | 69,489.44 | 10/05/2001 |
| Line of Credit | 12345678901234 | 2,330.00 | 10/05/2001 |
| Line of Credit | 1234567890123456 | 500.00 | 10/05/2001 |
| Total: | | 75,949.83 | |

Installment Loan Accounts

| Account | Number | Payoff | Good Through |
|---|---|---|---|
| Installment Loan | 1234567890 | 3,150.10 | 10/05/2001 |
| Total: | | 3,150.10 | |

Commercial Loan / Line of Credit Accounts

| Account | Number | Principal Bal | Effective Date |
|---|---|---|---|
| Commercial Loan | 1234567890-1234567890 | 319,600.00 | 10/05/2001 |
| Commercial Line of Credit | 1234567890-1234567890 | 300,000.00 | 10/05/2001 |
| Total: | | 619,600.00 | |

KeyBank Retirement Accounts

| Account | Number | Balance | Effective Date |
|---|---|---|---|
| Retirement Plan | | | |
| Fixed Rate IRA | 1234567890 | 1,000.00 | 10/05/2001 |
| Fixed Rate IRA | 123456789012 | 500.00 | 10/05/2001 |
| Plan Total | | 1,500.00 | |
| Total: | | 1,500.00 | |

Total Access Accounts

| Account | Number | Payoff | Available Bal | Effective Date |
|---|---|---|---|---|
| Total Access Checking | 1234567890 | 13,300.00 | 21,300.45 | 10/05/2001 |
| Total: | | 13,300.00 | | |

Investment Accounts

| Account | Number | Principal Bal | Effective Date |
|---|---|---|---|
| Total Access Investments | 12345678 | 150,000.00 | 10/05/2001 |
| Robert Smith Trust | 12345678901234 | 349,107.71 | 10/05/2001 |
| Total: | | 499,107.71 | |

Member FDIC

Related Links
- Schedule Payments
- Bill Pay Information
- Transfer Funds
- Budget Management
- Complete Picture
- Online Statements

Messages
- You have 7 message(s)
- View Sent Messages
- Contact Us _76_

Planning Center
- Retirement
- Life Events
- Education Planning
- Changing Jobs
- Calculators

The following boxed disclosure applies to the Total Access Account.

---

Current day brokerage transactions and any unsettled trades are not reflected in the TAA/Sweep Account Brokerage Cash/Money Market balance.

All quotes are delayed by 20 minutes or more.

Securities positions and balances are not real time. Balances may be rounded to the nearest .01. Some balances may not appear due to availability of pricing information.

McDonald Financial Group is a program from several KeyCorp subsidiaries; Inc., Member NASD/NYSE/SIPC offering securities; KeyBank National Association, Member Fdic offering banking products; and KeyCorp insurance Agency USA Inc. (KeyCorp Insurance Agency, Inc. in NY, CA and MA) offering insurance; and other affiliated entities As a client, you may do business with several legal entities and should review the important additional disclosures your advisor will provide. Securities and insurance products are:

- Not FDIC Insured • May Lose Value • Not Bank Guaranteed • Not a Deposit
- Not Insured by any Federal ar State Government Agency

---

See the Help section for details regarding the timeliness of the valuations.

Member FDIC

FIG. 4B

Online Banking and Investing

| HOME | SITE MAP | EXIT |
|------|----------|------|
| HELP | PREFERENCES | CONTACT US |

▶ ACCOUNTS & TRANSACTIONS ▶ INVESTMENT RESEARCH ▶ SELF SERVICE

Messages > View Messages

View Messages  _78_  (?)

▼ Related Links
Account Summary
Breaking News
Markets

▼ Messages
You have 7 message(s)
View Sent Messages
Contact Us

▼ Planning Center
Retirement
Life Events
Education Planning
Changing Jobs
Calculators

Important Announcements
- Did you know that your bill payments are guaranteed? If properly scheduled, we guarantee that payments will be received within 5 business days. If the payee doesn't receive the payment within that time frame, Key will rebate any late fees.

Special Offers
- Since You are such a valued customer, You have qualified for a Preferred Line of Credit.
- Did you Key.com Today ?

_80_

Personal Messages
- Your CD (0123456789) has reached its maturity date. At this time, you can make changes to the CD or close the CD. To begin the process, go to the Certificate of Deposit Account Details page. Online Banking and Investing also makes it easy for you to open a new CD account. To open a new account, select the "New Accounts" options under "Accounts & Transactions".

- We'd like to verify your email address. Please take a moment to review the address we have on file by clicking here.

- Please select a Start Page. The Start Page feature allows you to identify which screen you would like to display every time you sign on to Online Banking and Investing.

- ☐ Your bill payment to Dr. John Smith in the amount of 4,000.00 scheduled for 10/15/2001 could not not be paid due to insufficient funds.

Note: Personal Messages preceded by check boxes can be deleted by selecting the check box and clicking the "Delete" Button. All other Personal Messages will continue to be displayed until the message has been addressed.

FIG. 5

| | Online Banking and Investing | HOME | SITE MAP | EXIT |
| --- | --- | --- | --- | --- |
| | | HELP | PREFERENCES | CONTACT US |

▶ ACCOUNTS & TRANSACTIONS ▶ INVESTMENT RESEARCH ▶ SELF SERVICE

Accounts & Transactions > Account Summary > Certificate of Deposit Details

Certificate of Deposit Account Details  94  96

[ CHANGE CD OPTIONS ]  [ CLOSE ACCOUNT ]

┌─ 92

*Your Certificate of Deposit (CD) has matured and has automatically been renewed for you. Your renewed CD is shown below. If you would like to make changes to the CD, select "Change CD Options". If you would like to close your CD, select "Close Account".*

▼ Related Links
Account Summary
Transfer Funds
CD Account Descriptions

▼ Messages
You have 7 message(s)
View Sent Messages
Contact Us

▼ Planning Center
Retirement
Life Events
Education Planning
Changing Jobs
Calculators

Key Certificate of Deposit                               123456789
Current Balance                                              4,000.00
Last Interest Payment, paid on 10/01/2001                       32.70
Total Interest Paid YTD, as of 10/01/2001                        0.00
Total Interest Paid Last Year                                  164.76
Interest Rate                                                    1.57%
Term                                                         6 months
                            Member FDIC Using the Change CD Options feature, you can make changes to the CD on the following dates, 12/02/2003 through 12/12/2003. With this feature, you can select a different type of CD, select a different term/rate/APY, and/or change the balance on your CD.

Using the Close Account feature, you can close the CD and have the funds deposited into one of your Key deposit accounts on the following dates, 12/02/2003 through 12/12/2003.

See your CD disclosure for an explanation of the grace period. Due to routine system maintenance, this feature's availability will vary.

In addition to the features above, Online Banking and Investing also makes it easy for you to open a new CD account. To open a new account, select the "New Accounts" option under "Accounts & Transactions".

| | Online Banking and Investing | HOME | SITE MAP | EXIT |
| --- | --- | --- | --- | --- |
| | | HELP | PREFERENCES | CONTACT US |

▶ ACCOUNTS & TRANSACTIONS ▶ INVESTMENT RESEARCH ▶ SELF SERVICE

Accounts & Transactions > Account Summary > Certificate of Deposit Details > CD Close Account

CD Close Account

▼ Related Links
Account Summary
Transfer Funds
CD Account Descriptions

Auto-Renewed CD Account Details
Key Certificate of Deposit                                                                 123456789
Closing Balance                                                                                 4,000.00

▼ Messages
You have 7 message(s)
View Sent Messages
Contact Us

*To close this account for the Closing Balance shown above, select a reason and the deposit account to which you would like the funds transferred, then select "Continue".* 106

▼ Planning Center
Retirement
Life Events
Education Planning
Changing Jobs
Calculators

Reason for Close:   [Please select a reason ▼]   108

Transfer to Account:   [Please Select an account: ▼]

[CONTINUE]  [CANCEL] ~112
   110

The following boxed disclosure applies to the Total Access Account.

Current day brokerage transactions and any unsettled trades are not reflected in the TAA/Sweep Account Brokerage Cash/Money Market balance.

The Total Access Account and Sweep Checking Account may include non-insured investments.

McDonald Financial Group is a program from several KeyCorp subsidiaries; Inc., Member NASD/NYSE/SIPC offering securities; KeyBank National Association, Member Fdic offering banking products; and KeyCorp insurance Agency USA Inc. (KeyCorp Insurance Agency, Inc. in NY, CA and MA) offering insurance; and other affiliated entities As a client, you may do business with several legal entities and should review the important additional disclosures your advisor will provide. Securities and insurance products are:

• Not FDIC Insured  • May Lose Value  • Not Bank Guaranteed  Not a Deposit
• Not Insured by any Federal ar State Government Agency See the Help section for details regarding the timeliness of the valuations.

Member FDIC                                                             104

Online Banking and Investing

| HOME | SITE MAP | EXIT |
|------|----------|------|
| HELP | PREFERENCES | CONTACT US |

▶ ACCOUNTS & TRANSACTIONS   ▶ INVESTMENT RESEARCH   ▶ SELF SERVICE

Accounts & Transactions > Account Summary > Certificate of Deposit Details > Change CD Options

Change CD Options - Electronic Records Disclosure  _132_

▼ Related Links
Account Summary
Transfer Funds
CD Account Descriptions

▼ Messages
You have 7 message(s)
View Sent Messages
Contact Us

▼ Planning Center
Retirement
Life Events
Education Planning
Changing Jobs
Calculators Before continuing, please read carefully the Electronic Records Disclosure below. You must select "Accept" to continue the Change CD Options process. If you select "Decline", you will not be able to complete any changes to your CD.

Please print this page and retain for your records - Printer Friendly Version

Acceptance of Agreement and Signature
When you click the "Accept" button below, it constitutes your written signature and approval of, and intent to be bound by the terms of this Electronic Records Disclosure Agreement and to your consent to receive the resulting Certificate of Deposit account opening disclosures online for this new Certificate of Deposit. These electronic disclosures will be presented before you submit your Change CD Options selections.

DISCLOSURE
In connection with the new Certificate of Deposit account and as a result of the changes designated by you during the Change CD Option process, the related agreements and disclosures ("Electronic Records") provided by Key Bank, National Association and its affiliates (collectively called "Key") are delivered electronically on this website. Electronic Records may not be generally available on paper or in a non-electronic form from Key, except Key may, at its option, provide Electronic Records in paper-based media if requested by you. However, periodic account statements showing activity in your accounts may be mailed to you at the address designated in your records. You may print Electronic Records from your Internet access device if you have the necessary equipment. You may request a paper copy of any Electronic Record by calling 1-800-KEY2YOU®. Key may assess you its fees and charges then in effect and published for providing these copies.

Your consent to receive the Electronic Records applies to the new Certificate of Deposit account resulting due to the Change CD Options selected during this session only. If you do not consent to the use of Electronic Records, you will be unable to Change your CD Options online. You may withdraw your consent at any time during this session by clicking the "Cancel" button at the bottom of any page during the Change CD Option process. All of your information will be erased and you will be returned to the Certificate of Deposit Account Detail page in the application. By calling Key 1-800-KEY2YOU® or, for Small Business customers, 1-888-KEY4BIZ® (1-888-539-4249), you may either cancel this consent prior to Key's establishing the new Certificate of Deposit account or cancel this consent anytime after your account is established. If periodic statements are available for this type of Certificate of Deposit and you wish to receive online delivery of periodic account statements, you will need to approve a separate consent for electronic delivery and accept Key's terms and conditions for this supplemental service.

System Requirements
To change your CD options and receive your new Certificate of Deposit disclosures online, you will need an Internet enabled device.

Browser Requirements
In order to provide the strongest available encryption, your browser must be capable of supporting 128-bit SSL communications or higher. Access to this page verifies that your browser meets our standard requirements.

CONSENT TO ELECTRONIC RECORDS
I hereby consent to the use of Electronic Records in connection with changing my CD options and the resulting new Certificate of Deposit requested online at Key. I am consenting to use Electronic Records only for the new Certificate of Deposit account that I choose during this online session. Matured Certificates of Deposit changed after this session will require additional consent. If the account is a joint account, this consent applies to all individuals designated as account parties thereon.

For help, call us at 1-800-539-9055.

Member FDIC

_Last Modified: September 2003_

133 — [ ACCEPT ]    [ DECLINE ] — 134

FIG. 10

Online Banking and Investing

| HOME | SITE MAP | EXIT |
| --- | --- | --- |
| HELP | PREFERENCES | CONTACT US |

▶ ACCOUNTS & TRANSACTIONS  ▶ INVESTMENT RESEARCH  ▶ SELF SERVICE

Accounts & Transactions > Account Summary > Certificate of Deposit Details > Change CD Options

Change CD Options - Select Account Type  142

151

▼ Related Links
Account Summary
Transfer Funds
CD Account Descriptions

Auto-Renewed CD Account Details  143
| | |
| --- | --- |
| Key Certificate of Deposit | 123456789 |
| Current Balance | 4,000.00 |
| Interest Rate | 1.57% |
| Term | 6 months |

Progress Indicator
▶ Select Account Type
Select Term
Select Balance Amount
Review Selections
Review Disclosure
Confirmation ▼ Messages
You have 7 message(s)
View Sent Messages
Contact Us ▼ Planning Center
Retirement
Life Events
Education Planning
Changing Jobs
Calculators

*To start the Change CD Options process, select an account type option, then select "Continue".*

Note: You must meet the qualifications for the account type you select. 148   150

| 152 | 144 Account Type | 146 Qualifications | Terms | As of 12/31/2002 | |
| --- | --- | --- | --- | --- | --- |
| | | | | Interest Rate Range* | APY Range* |
| ⊙ | Key CD: A fixed-term renewal CD that keeps your account earning interest, even after maturity. Pays higher, fixed rates of interest to accounts with higher balances. | Minimum opening balance is $1,000. | 6 months to 10 years | 1.09% to 2.03% | 1.10% to 2.95% |
| ○ | Key CD with Relationship Reward: All the benefits of the Key CD with Relationship Reward premium interest for customers with a qualifying checking account. | An active KeyAdvantage or Key Privilege checking account. Minimum opening balance is $1,000. | 6 months to 10 years | 1.25% to 3.25% | 1.15% to 3.85% |
| ○ | Key Short Term CD: Fixed-term account with competitive rates and a variety of terms from which to choose. Auto renews at maturity for continued interest earnings. | Minimum opening balance is $1,000. | 7 days to 179 days | 1.25% to 3.25% | 1.15% to 3.85% |
| ○ | Key Tiered CD: Key Tiered CD lets you build the fixed term account to suit your needs. Higher, fixed rates paid for higher balances. | Minimum opening balance is $1,000. | 6 months to 10 years | 1.25% to 3.25% | 1.15% to 3.85% |
| ○ | Key Tiered CD with Relationship Reward: All the benefits of Key Tiered CD with Relationship Reward premium interest for customers with a qualifying checking account. | An active KeyAdvantage or Key Privilege checking account. Minimum opening balance is $1,000. | 6 months to 10 years | 1.25% to 3.25% | 1.15% to 3.85% |
| ○ | Key Step Rate CD: Guaranteed that your rates will rise, and the ability to withdraw without penalty at each rate increase interval. | Minimum opening balance is $5,000. | 24 months 48 months | 1.15% to 2.35% | 2.35% to 3.255% |
| Not Available Online | Key Freedom CD: Designed to allow flexibility. You can change your rate, or deposit, or withdraw from your balance within the first 6 months. | An active Key qualified checking account. Minimum balance is $10,000. | 18 months | 1.22% | 1.26% |

The CD products listed above are based on your current CD balance. For more information or rates on CD products greater than $100,000, please select Contact Us.

The term "Not Eligible" means you do not meet the necessary qualifications.

The term "Not Available Online" means that the account type may be available in your area through our KeyCenters or Telesales department.

Additional CD account types may be available. Please select Contact Us for more information.

[ CONTINUE ]   [ CANCEL ]

* All interest rates and annual percentage yields (APY) are those in effect the day your CD matured and will be the fixed interest rate and APY for the account you select. Fees may reduce earnings on the account. A penalty will be imposed for early withdrawal.

Member FDIC

FIG. 11B

Online Banking and Investing

| HOME | SITE MAP | EXIT |
|---|---|---|
| HELP | PREFERENCES | CONTACT US |

▶ ACCOUNTS & TRANSACTIONS  ▶ INVESTMENT RESEARCH  ▶ SELF SERVICE

Accounts & Transactions > Account Summary > Certificate of Deposit Details > Change CD Options

Change CD Options - Select Term  158

Auto-Renewed CD Account Details
Key Certificate of Deposit     123456789
Current Balance     4,000.00
Interest Rate     1.57%
Term     6 months

Progress Indicator
✓ Select Account Type
▶ Select Term
   Select Balance Amount
   Review Selections
   Review Disclosure
   Confirmation ▼ Related Links
Account Summary
Transfer Funds
CD Account Descriptions ▼ Messages
You have 7 message(s)
View Sent Messages
Contact Us ▼ Planning Center
Retirement
Life Events
Education Planning
Changing Jobs
Calculators

Previous Options Selected

| Account Type | Minimum Opening Balance | Maximum Balance |
|---|---|---|
| Key CD with Relationship Reward: All the benefits of the Key CD with Relationship Reward premium interest for customers with a qualifying checking account. | $1,000 | 99,999 |

To continue the Change CD Options process, enter a Term into the input box, select the Days, Months or Years option, then select "Continue".

Term: [ ] [Days ▼]
    └─166   └─168               162                      164

| 160 Term | As of 12/31/2002 | | Term Balance | |
|---|---|---|---|---|
| | Interest Rate* | APY* | Minimum Balance | Maximum Balance |
| 6-7 Months | 1.15% | 1.15% | 1,000 | 9,999 |
| | 1.25% | 1.25% | 10,000 | 49,999 |
| | 1.35% | 1.35% | 25,000 | 49,999 |
| | 1.45% | 1.45% | 50,000 | 99,999 |
| 8 Months | .65% | .66% | 1,000 | 9,999 |
| | .70% | .71% | 10,000 | 49,999 |
| | .80% | .81% | 25,000 | 49,999 |
| | .90% | .91% | 50,000 | 99,999 |
| 9-11 Months | .64% | .65% | 1,000 | 9,999 |
| | .69% | .70% | 10,000 | 49,999 |
| | .79% | .80% | 25,000 | 49,999 |
| | .94% | .95% | 50,000 | 99,999 |
| 12-14 Months | .65% | .65% | 1,000 | 9,999 |
| | .70% | .71% | 10,000 | 49,999 |
| | .80% | .81% | 25,000 | 49,999 |
| | .90% | .91% | 50,000 | 99,999 |
| 15 Months | .66% | .65% | 1,000 | 9,999 |
| | .70% | .71% | 10,000 | 49,999 |
| | .80% | .81% | 25,000 | 49,999 |
| | .90% | .91% | 50,000 | 99,999 |
| 16-17 Months | .65% | .66% | 1,000 | 9,999 |
| | .70% | .71% | 10,000 | 49,999 |
| | .80% | .81% | 25,000 | 49,999 |
| | .90% | .91% | 50,000 | 99,999 |

FIG.12A

| | | | | |
|---|---|---|---|---|
| 18 Months | .65% | .66% | 1,000 | 9,999 |
| | .70% | .71% | 10,000 | 49,999 |
| | .80% | .81% | 25,000 | 49,999 |
| | .90% | .91% | 50,000 | 99,999 |
| 19-20 Months | .65% | .66% | 1,000 | 9,999 |
| | .70% | .71% | 10,000 | 49,999 |
| | .80% | .81% | 25,000 | 49,999 |
| | .90% | .91% | 50,000 | 99,999 |
| 21 Months | .66% | .65% | 1,000 | 9,999 |
| | .70% | .71% | 10,000 | 49,999 |
| | .80% | .81% | 25,000 | 49,999 |
| | .90% | .91% | 50,000 | 99,999 |
| 22-29 Months | .66% | .65% | 1,000 | 9,999 |
| | .70% | .71% | 10,000 | 49,999 |
| | .80% | .81% | 25,000 | 49,999 |
| | .90% | .91% | 50,000 | 99,999 |
| 30 Months | .65% | .66% | 1,000 | 9,999 |
| | .70% | .71% | 10,000 | 49,999 |
| | .80% | .81% | 25,000 | 49,999 |
| | .90% | .91% | 50,000 | 99,999 |
| 31-59 Months | .65% | .66% | 1,000 | 9,999 |
| | .70% | .71% | 10,000 | 49,999 |
| | .80% | .81% | 25,000 | 49,999 |
| | .90% | .91% | 50,000 | 99,999 |
| 5 years | .65% | .66% | 1,000 | 9,999 |
| | .70% | .71% | 10,000 | 49,999 |
| | .80% | .81% | 25,000 | 49,999 |
| | .90% | .91% | 50,000 | 99,999 |
| 6 years | .65% | .66% | 1,000 | 9,999 |
| | .70% | .71% | 10,000 | 49,999 |
| | .80% | .81% | 25,000 | 49,999 |
| | .90% | .91% | 50,000 | 99,999 |
| 7 years | .65% | .65% | 1,000 | 9,999 |
| | .70% | .71% | 10,000 | 49,999 |
| | .80% | .81% | 25,000 | 49,999 |
| | .90% | .91% | 50,000 | 99,999 |
| 8 years | .65% | .66% | 1,000 | 9,999 |
| | .70% | .71% | 10,000 | 49,999 |
| | .80% | .81% | 25,000 | 49,999 |
| | .90% | .91% | 50,000 | 99,999 |
| 9 Months | .66% | .66% | 1,000 | 9,999 |
| | .70% | .71% | 10,000 | 49,999 |
| | .80% | .81% | 25,000 | 49,999 |
| | .90% | .91% | 50,000 | 99,999 |
| 10 years | .65% | .66% | 1,000 | 9,999 |
| | .70% | .71% | 10,000 | 49,999 |
| | .80% | .81% | 25,000 | 49,999 |
| | .90% | .91% | 50,000 | 99,999 |

170 — [ CONTINUE ]  [ CANCEL ]

\* All interest rates and annual percentage yields (APY) are those in effect the day your CD matured and will be the fixed interest rate and APY for the account selected. Based on the balance tier range your balance falls within for the term selected, the fixed interest rate for that range will be paid on the entire CD balance. Fees may reduce earnings on the account. A penalty will be imposed for early withdrawal.

FIG.12B

Online Banking and Investing

| HOME | SITE MAP | EXIT |
| HELP | PREFERENCES | CONTACT US |

▶ ACCOUNTS & TRANSACTIONS  ▶ INVESTMENT RESEARCH  ▶ SELF SERVICE

Accounts & Transactions > Account Summary > Certificate of Deposit Details > Change CD Options

Change CD Options - Select Balance Amount

▼ Related Links
Account Summary
Transfer Funds
CD Account Descriptions

174

Auto-Renewed CD Account Details
Key Certificate of Deposit     123456789
Current Balance     4,000.00
Interest Rate     1.57%
Term     6 months Progress Indicator
✓ Select Account Type
✓ Select Term
▶ Select Balance Amount
    Review Selections
    Review Disclosure
    Confirmation

▼ Messages
You have 7 message(s)
View Sent Messages
Contact Us

▼ Planning Center
Retirement
Life Events
Education Planning
Changing Jobs
Calculators

Previous Options Selected   176

| Account Type | Term | As of 12/31/2002 | | Minimum Balance | Maximum Balance |
| --- | --- | --- | --- | --- | --- |
| | | Interest Rate* | APY* | | |
| Key CD with Relationship Reward: All the benefits of the Key CD with Relationship Reward premium interest for customers with a qualifying checking account. | 7 months | 1.15% | 1.16% | 1,000 | 9,999 |
| | | 1.25% | 1.26% | 10,000 | 24,999 |
| | | 1.35% | 1.36% | 25,000 | 49,999 |
| | | 1.45% | 1.46% | 50,000 | 99,999 |

*To continue the Change CD Options process, select a balance amount option, then select "Continue".*

180                                                        178

○ No balance amount changes
                               186
○ Additional Deposit
    Transfer From Account: [ Please Select an account: ▼ ]
182    Amount (0.00): [    ]
                 188                    190
○ Partial Withdrawal
    Transfer to Account: [ Please Select an account: ▼ ]
184    Amount (0.00): [    ] 200

*Note: The effective date associated with the balance amount option selected above is based upon processing cutoff times. Please view Help for more details*

202

[ CONTINUE ]   [ CANCEL ]

\* All interest rates and annual percentage yields (APY) are those in effect the day your CD matured and will be the fixed interest rate and APY for the account selected. Based on the balance tier range your balance falls within for the term selected, the fixed interest rate for that range will be paid on the entire CD balance. Fees may reduce earnings on the account. A penalty will be imposed for early withdrawal.

The following boxed disclosure applies to the Total Access Account.

---

Current day brokerage transactions and any unsettled trades are not reflected in the TAA/Sweep Account Brokerage Cash/Money Market balance.

The Total Access Account and Sweep Checking Account may include non-insured investments.

McDonald Financial Group is a program from several KeyCorp subsidiaries; Inc., Member NASD/NYSE/SIPC offering securities; KeyBank National Association, Member Fdic offering banking products; and KeyCorp insurance Agency USA Inc. (KeyCorp Insurance Agency, Inc. in NY, CA and MA) offering insurance; and other affiliated entities As a client, you may do business with several legal entities and should review the important additional disclosures your advisor will provide. Securities and insurance products are:

• Not FDIC Insured  • May Lose Value  • Not Bank Guaranteed  Not a Deposit
• Not Insured by any Federal ar State Government Agency

---

See the Help section for details regarding the timeliness of the valuations.

Member FDIC

FIG. 13B

| | Online Banking and Investing | HOME | SITE MAP | EXIT |
| --- | --- | --- | --- | --- |
| | | HELP | PREFERENCES | CONTACT US |

▶ ACCOUNTS & TRANSACTIONS ▶ INVESTMENT RESEARCH ▶ SELF SERVICE

Accounts & Transactions > Account Summary> Certificate of Deposit Details > Change CD Options ▼ Related Links
Account Summary
Transfer Funds
CD Account Descriptions

Change CD Options - Review Disclosure    212

*To complete the Change CD Options process, please read the important Agreements and Disclosures below. You must select "Accept" to complete the Change CD Option process. If you select "Decline", you will not be able to complete any changes to your CD.*

Please print this page and retain for your records - Printer Friendly Version

Note: If you do not wish to print the Agreements and Disclosures at this time, they will be available for you to view and print for 90 days on Key.com in our "Apply Online" section. Therefore, it is important for you to record today's date and the name of the new Certificate of Deposit account to ensure that you are able to retrieve the same Agreements and Disclosures provided to you today.

Progress Indicator
✓ Select Account Type
✓ Select Term
✓ Select Balance Amount
✓ Review Selections
▶ Review Disclosure
   Confirmation ▼ Messages
You have 7 message(s)
View Sent Messages
Contact Us ▼ Planning Center
Retirement
Life Events
Education Planning
Changing Jobs
Calculators

---

Personal Certificates of Deposit Account Fees and Disclosures

Greater Cleveland

Effective December 14, 2001
KeyBank National Association

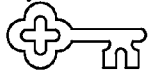

KeyBank

Member FDIC

Today's Date Is November 15, 2002

MajorSaver® Certificate of Deposit

| Term 180 Days | Interest Rate 1.29%* | APY 1.30%* |
| --- | --- | --- |

Maturity Date: Your maturity date is reflected on your Certificate of Deposit receipt that you received at the time you opened your Account or that you received in the mail if you opened your Account over the phone or online.

*For Personal Accounts, the Interest Rate(s) quoted and corresponding Annual Percentage Yield(s) ("APY") are those which were in effect on the day the Account was opened or an inquiry was made as specified above. The applicable Interest Rate applies to the entire balance in the Account. Rates are guaranteed only to the extent specified in this Personal Certificates of Deposit Account Fees and Disclosures.

This Personal Certificates of Deposit Account Fees and Disclosures ("Disclosure") provides information about deposit accounts we offer. While this Disclosure is accurate as of the effective date noted above, specific product features may be changed from time to time. A copy of the current Disclosure may be obtained upon request by contacting us. Current Interest Rate information may be obtained by contacting your KeyCenter or by calling 1-800-KEY2YOU® (1-800-539-2968) TDD 1-800-KEY-TDD1(1-800-539-8331).

The minimum deposit required to open an Account (Certificate Account) is as follows:

Account Type    Minimum Deposit

FIG.15A

MajorSaver Certificate of Deposit  $5000.00

Additional deposits may not be made during the term to a Key Certificate of Deposit, a MajorSaver Certificate of Deposit, a Key Advantage MajorSaver Certificate of Deposit, or a Step Rate Certificate of Deposit Account.

There are no monthly maintenance service charges or per-item charges on Certificate of Deposit Accounts. Charges such as wire transfer charges and handling legal process charges apply.

Interest Rates & Payments
The Interest Rate and Annual Percentage Yield ("APY") are reflected above and on the deposit receipt. The Interest Rate is the rate in effect on the day the Account is opened and the APY quoted is the yield which would result if the initial Interest Rate were to remain in effect for an entire year. The APY assumes interest remains on deposit until maturity. A withdrawal of interest (including by check or by deposit to another account) prior to maturity will reduce earnings.

The initial Interest Rate on a Key Certificate of Deposit Account, MajorSaver Certificate of Deposit and a Key Advantage MajorSaver Certificate of Deposit Account will be in effect for the length of the term of your Account.

A Certificate Account earns interest from the date of deposit to (but not including) the maturity date. If the maturity date shown on the deposit receipt falls on a Saturday, Sunday, or a legal holiday, the Certificate Account will be payable on the next bank business day and will earn interest until that day. We use the Daily Balance method to compute interest on Certificate Accounts. This method applies the daily percentage rate to the balance in your Account at the close of business for that day. We compute the daily percentage rate by dividing the interest rate by the actual number of days in the year. Interest begins to accrue on non-cash items (for example, checks) presented to us no later than the business day we receive credit for the deposit.

Interest will be compounded daily on all Certificate Accounts. If the Account is a negotiated Certificate Account, the compounding and/or interest payment frequency will be reflected on your receipt.

Interest will be credited as specified in the chart below. Your deposit receipt indicates the option applicable to your Account. Interest will be left in the Account unless you instruct us otherwise. Once credited, interest may be withdrawn from the Account without penalty before the maturity date of the Account.

Interest Payment Options*

| Type of Account | Payment Frequency | Interest Payment Dates | Payment to Other Accounts |
|---|---|---|---|
| Up to 180 Day Certificate of Deposit | At Maturity | On your Maturity Date | Optional for all terms over 31 days |
| 181-364 Day and 12 Month Certificate of Deposit | Monthly or at Maturity | Monthly on Anniversary Date or Maturity Date | Optional |
| 13-120 Month Certificate of Deposit | Monthly, Quarterly or Annually | Monthly on Anniversary Date or Quarter end | Optional |

*You may receive interest payments by check only if the Certificate of Deposit balance is $5,000 or more.*

Early Withdrawal Penalties
You have contracted to keep funds in your Certificate Account on deposit with us until the maturity date. We retain the right to refuse to allow early withdrawal at our discretion. If we allow you to make an early withdrawal, the following penalties apply. If the penalty exceeds the amount of interest earned to the date of withdrawal, the difference will be taken out of principal.

| Term of Certificate of Deposit | Penalty |
|---|---|
| 7 - 31 days | All simple interest earned with a minimum penalty of 7 days' simple interest |
| 32 - 89 days | One month's simple interest |
| 90 - 359 days | Three months' simple interest |
| 360 days - 23 months | Six months' simple interest |
| 24 - 47 months | Nine months' simple interest |
| 48 months and more | Twelve months' simple interest |

FIG.15B

Account Maturity and Automatic Renewal
All Certificate of Deposit Accounts will renew automatically unless you specifically request that the Certificate be single maturity. Your Certificate Account will automatically renew at maturity if the automatic renewal provision is checked on your deposit receipt. If the term of your Account is 32 days or greater and it renews automatically, we will notify you before the maturity date. If the term of your Account is less than 32 days and it renews automatically, a notice will only be provided if there is a change in the terms of your Account. All Account types except MajorSaver, Key Advantage MajorSaver, Key Step Rate and Key Freedom Certificates of Deposit will be renewed automatically at the then prevailing interest rate (excluding any premium or special rate we may then be offering) for traditional Certificate Accounts of the same type and with the same term, unless you notify us otherwise. A MajorSaver, Key Advantage MajorSaver, Key Step Rate and Key Freedom Certificate of Deposit will convert upon renewal to a traditional Key Certificate of Deposit at the then prevailing interest rate (excluding any premium or special rate we may then be offering) for a Key Certificate of Deposit Account with the same term, unless you notify us otherwise.

If the term of your Account is 32 days or greater, there is a ten (10) calendar day grace period after the maturity date. If the term of your Account is less than 32 days, there is no grace period. You may withdraw your funds in part or in whole, make additional deposits, or change the term of your Account within the ten (10) calendar day grace period for Accounts with terms of 32 days or greater, or on the maturity date for Accounts with terms less than 32 days. If the tenth day for Accounts with terms of 32 days or greater is a Saturday, Sunday, or a legal holiday, you have until the last business day before that day to make these changes. If the maturity date for accounts with terms of less than 32 days is a Saturday, Sunday, or a legal holiday, you have until the next business day after that day to make these changes.

Your Account will not renew automatically if the automatic renewal provision is not checked on your deposit receipt. If the term of your Account is 32 days or greater and if your Account is not one that automatically renews, we will notify you before the maturity date of your Account and may, at our discretion, give you the option to reinvest the funds in a new Certificate Account. Once the Account has matured, if it is not renewed or reinvested (within the ten (10) day grace period for Accounts with terms of 32 days or greater), it will cease to earn interest. We will pay the proceeds of the Account to you or reinvest the proceeds of the Account in accordance with your instructions.

Any Account with a term of 32 days or greater that is renewed automatically, or reinvested at your option within ten (10) days after the maturity date, will earn interest without interruption. Otherwise, no interest will be earned after maturity. Interest credited to the Account and not withdrawn before renewal or reinvestment will become part of the balance of the Account at maturity and may not be withdrawn without penalty, except as mentioned above. We reserve the right not to renew or reinvest a Certificate Account.

ACCEPT 216  DECLINE 218

SYSTEM AND METHOD FOR RENEGOTIATING A FINANCIAL INSTRUMENT

COPYRIGHTED MATERIAL

A portion of the disclosure of this patent document contains material that is subject to copyright protection. The copyright owner has no objection to facsimile reproduction of the patent document or the patent disclosure, as it appears in the U.S.P.T.O. files or records, but otherwise reserves all copyrights in such material.

BACKGROUND OF THE INVENTION

The present invention relates to systems and methods for conducting financial transactions over a network and, more particularly, to systems and methods for renegotiating financial instruments over a network.

Open communication networks, such as the Internet, in combination with the prevalence of personal computers that access such networks, have given rise to electronic commerce in which personal computers operated by customers and clients exchange information with and conduct business transactions with computing systems operated by merchants. A burgeoning component of electronic commerce comprises banking and investment transactions. Such networks enable a customer of a financial institution or investment institution, through his or her personal computer, to access his or her account at that financial or investment institution and remotely perform such financial transactions as transferring funds from one account to another at the institution, paying bills to third parties using funds of the institution and the like.

An example of such a system is disclosed in U.S. Pat. No. 6,131,810 issued to Weiss et al. That patent discloses a consumer banking system and method in which a customer, at his or her personal computer, accesses the computer system of a financial institution by way of the Internet to perform such functions as opening a checking account, purchasing a certificate of deposit, obtaining a credit card and applying for a loan. The financial institution disclosed in that patent is capable of exchanging information and opening accounts with customers who access that institution from a variety of input sources in addition to personal computers, such as automatic teller machines ("ATM's"), telephones, personal digital assistants, ("PDA's"), telephone representatives and the like.

It is now commonplace for a bank customer to access a Web page on the Internet and, by providing personal identification information, access current information regarding the customer's various accounts with the financial institution that maintains the Web page. However, a disadvantage with such systems is that the number and variety of transactions that can be performed is limited. For example, while it might be possible for a customer of a financial institution to transfer funds from one account to another, or to purchase a certificate of deposit, it is not possible for that customer to, for example, renegotiate or "roll over" a certificate of deposit or other financial instrument. Accordingly, there is a need for a system and method for conducting financial transactions over a network that possesses greater capabilities with respect to transfer of funds.

SUMMARY

The present invention is a method and system for renegotiating a financial instrument in which all of the steps of the renegotiation are conducted over a network such as the Internet. The method of the invention includes the steps of initiating a logical session between a client program and a client interface affiliated with a financial institution, displaying financial information relating to a client on the client interface, displaying a message on the client interface that a financial instrument of that client may be renegotiated, transmitting a request to renegotiate the financial instrument to the client interface, displaying a disclosure document pertaining to the request to renegotiate, and if the client agrees to accept the terms of the disclosure document, displaying a plurality of renegotiation options to the client on the client interface and finally, transmitting a selection of one of the renegotiation options to the client interface.

The system of the present invention includes a client interface program that is resident in the computer system of a financial institution. The client interface program is capable of initiating a logical session with a client program and exchanging data with it, and sending financial information to and retrieving financial information from a legacy system of the financial institution having a customer data repository. An application server houses the client interface program and is connected to establish a logical session with a client program, resident on a personal computer, such that financial information relating to the client is displayed on a display device, such as a monitor, associated with the client program, and the client interface program is capable of retrieving data from the data repository that a financial instrument of the client may be renegotiated and displaying the message on the display device indicating that the financial instrument may be renegotiated. The client interface program is capable of soliciting and receiving a request to renegotiate the financial instrument from the client, displaying a disclosure document pertaining to the financial instrument to be renegotiated and requesting the client to assent to its terms and, in the event that the client agrees to accept the terms of the disclosure document, the client interface program is capable of displaying a plurality of renegotiation options to the client and of receiving a selection of one of the renegotiation options from the client. In a preferred embodiment, the client program may be merely an Internet access program, such as is provided by America Online ("AOL"), Internet Explorer or the like that is capable of providing access to a Website maintained by the client interface program and for exchanging information over the Internet with the computer system of the financial institution.

In a preferred embodiment, the method of the present invention is employed to renegotiate a certificate of deposit that has reached its maturity date. The method preferably is incorporated into an overall online banking and investing service provided by the associated financial institution. The process begins when a customer of the financial institution accesses the Web page or portal of the financial institution. There, the customer enters appropriate identification information, such as a user identification ("ID") number and password. The system of the present invention checks that information against stored information in an application that executes on the mainframe of the financial institution. If the identification information is valid, the customer's account summary is displayed at the screen of the customer's computer. In addition, the customer will access a page containing a message stating that a certificate of deposit account has matured, has been renewed automatically, and that a grace period exists during which the customer may renegotiate the certificate of deposit or, in the alternative, to close it and transfer funds generated by the certificate of deposit to another account of the customer at the institution. The message also directs the customer back to the account summary page where the customer picks a link that takes him or her to a certificate of deposit account details page. There, the customer is given the option of either closing the account or acquiring a new certificate of deposit with the same or different options, such as amount or term.

If the customer elects to close the account, the customer is then asked to select one of the customer's accounts, such as a checking or a savings account, to which the funds are to be transferred. That transaction is stored in a current day transaction data base and ultimately the customer's accounts are adjusted accordingly. In the alternative, if the customer elects to change the certificate of deposit options, the system displays an electronic records disclosure form and asks the customer to agree to its terms. That disclosure form is stored in the application server. If the customer agrees to the disclosure terms, the customer is then presented with a page displaying a set of certificate of deposit account options provided by the financial institution. Such options are obtained from a product information repository ("PIR") data base associated with the application server. In addition, information about the customer (such as the amount of funds available to be transferred to purchase a certificate of deposit of greater value) is considered and only those products that are appropriate for that customer are capable of being selected by the customer from among the entire range of product presented.

After the customer has selected the account type (that is, the specific type of certificate of deposit to be purchased) the customer is presented with a page that displays all of the available terms of that certificate of deposit and is asked to select a specific term from among them. The information displayed on that page is also obtained from the PIR data base. Once the customer has selected the term, the customer is presented with a page that asks the customer if the customer wishes to purchase a new certificate of deposit in the same amount as the matured certificate of deposit, add additional funds from another account at the financial institution to purchase a certificate of deposit of a greater amount or to make a partial withdrawal (that is, reinvest less than the full amount of the maturing certificate of deposit) and purchase a certificate of deposit of a lesser amount than the matured certificate of deposit. If the customer elects to add funds to the certificate of deposit or reduce the amount of the certificate of deposit, the customer is then asked to indicate the account from which the additional funds will be withdrawn or into which the surplus funds will be deposited, respectively.

Once that information is provided by the customer, the system displays a summary page that asks the customer to indicate approval. If the customer approves, the customer is then asked to review a disclosure form that lists all of the terms of the renegotiated certificate of deposit and indicate acceptance of those terms. If the customer indicates acceptance of the terms, the system displays a renewal receipt that confirms the transaction and may be printed by the customer at the customer's computer.

Accordingly, the present invention provides a method and system that enables a customer of a financial institution to renegotiate a financial instrument in a process that is entirely automated from the standpoint of the financial institution, and at the same time provides the customer the convenience of renegotiating the financial instrument from a location physically remote from the financial institution. Other objects and advantages of the invention will be apparent from the following description, the accompanying drawings and the appended claims.

BRIEF DESCRIPTION OF THE DRAWINGS

FIG. 3 shows a sign-on page of the present invention that provides access to various financial accounts of a customer;

FIG. 4 shows an account summary page of the present invention;

FIG. 5 shows a "View Messages" page of the present invention;

FIG. 6 shows a "Certificate of Deposit Account Details" page of the present invention;

FIG. 7 shows a "CD Close Account" page of the present invention;

FIG. 8 shows a "CD Close Account-Review" page of the present invention;

FIG. 10 shows an "Electronic Records Disclosure" page of the present invention;

FIG. 11 shows a "Change CD Options-Select Account Type" page of the present invention;

FIG. 12 shows a page of the present invention that displays the terms offered to a customer;

FIG. 13. shows a page of the present invention that prompts a user to select a balance amount;

FIG. 15 shows a page of the present invention that displays a disclosure form that contains all of the terms specific to the financial instrument selected by a customer.

DETAILED DESCRIPTION

Figure 1:
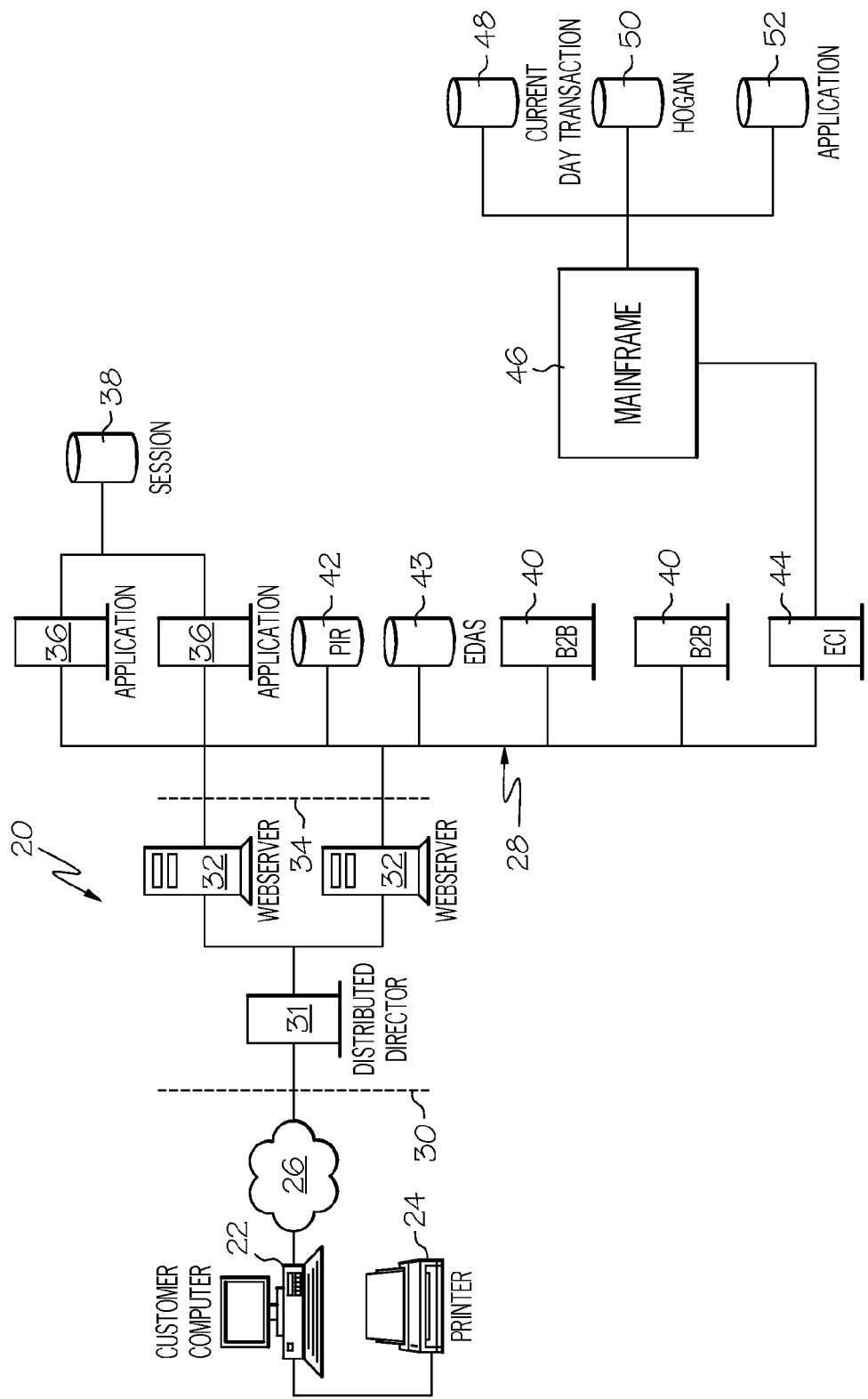
FIG. 1 is a schematic representation of the system architecture of the present invention.

The system of the present invention, generally designated 20, is shown schematically in FIG. 1. A customer computer 22, preferably having an associated printer 24, is connected to an open network such as the Internet 26. It should be noted that it is within the scope of the present invention to utilize a personal digital assistant ("PDA"), cellular telephone, touch screen kiosk, or the like instead of, or in addition to, computer 22. Furthermore, other networks, such as a secure network, local area network ("LAN") or wide area network ("WAN"), may be employed instead of open network 26 and not depart from the scope of the invention. The customer computer 22 may include Web accessing software, such as Netscape Navigator, Internet Explorer, America Online ("AOL"), that is referred to herein as a "client program."

The on-line banking system of the financial institution, generally designated 28, includes an external firewall 30 that allows communication with the Internet 26. The firewall 30 is connected to a distributed director 31, used for load balancing, and the distributed director is connected to an array of Web servers 32. Preferably, an internal firewall 34 is placed between the Web servers 32 and application servers 36.

The application servers 36 house the application software, written in JAVA, that performs the process of the invention. This software is referred to herein as the "client interface"

since it interacts with the client program. Application servers 36 are connected to session data base 38. Application servers 36 communicate with business-to-business ("B2B") servers 40 to retrieve rate information from the product information repository ("PIR") data base 42. Application servers 36 communicate with electronic disclosure automation system ("eDAS") data base 43 to retrieve disclosure documents required for the transaction. Application servers 36 use Customer Information Control System ("CICS") client software (a product of IBM Corp.) to communicate with the enterprise connectivity interface ("ECI") gateway servers 44 that are connected to the mainframe 46 of the financial institution to access ECI.

Mainframe 46 contains legacy data bases, including a current day transaction data base 48 and Hogan data base 50. Application data base 52 is also associated with mainframe 46. Mainframe 46 also includes middleware for communication with data bases 48, 50, 52. The current day transaction data base 48 contains balance information and current day transaction information of the accounts of the customers of the financial institution. The Hogan data base 50 contains information specific to customer accounts, such as the maturity dates of certificates of deposit and the renewal grace periods of the various certificates of deposit. Hogan data base 50 also contains information regarding rates and fees for all of the available CD products. Such information regarding rates and fees for available CD products is periodically copied to the PIR data base 42, where it is more readily available to other programs of the system. The architecture of the system as it includes the firewalls, application server, gateway server, mainframe and legacy data bases is also disclosed in U.S. application Ser. No. 09/458,872 filed Dec. 9, 1999 and entitled "REAL TIME INTERNET BANKING," the disclosure of which is incorporated herein by reference.

The eDAS data base 43 is part of an electronic disclosure automation system for creating and displaying appropriate financial disclosure documents associated with specific financial products and containing information specific to various geographic regions. The details of the eDAS system are disclosed in co-pending and commonly owned U.S. application Ser. No. 10/318,342 filed Dec. 12, 2002 and entitled "FINANCIAL DOCUMENT AUTOMATION SYSTEM AND METHOD," the disclosure of which is incorporated herein by reference. Application servers 36 are a part of a WebSphere system (provided by IBM Corp.). B2B servers 40 utilize webMethod software (a product of webMethods, Inc.). Information, such as rate information, is taken by eDAS from the PIR data base 42 to produce the disclosure documents.

Figure 2:
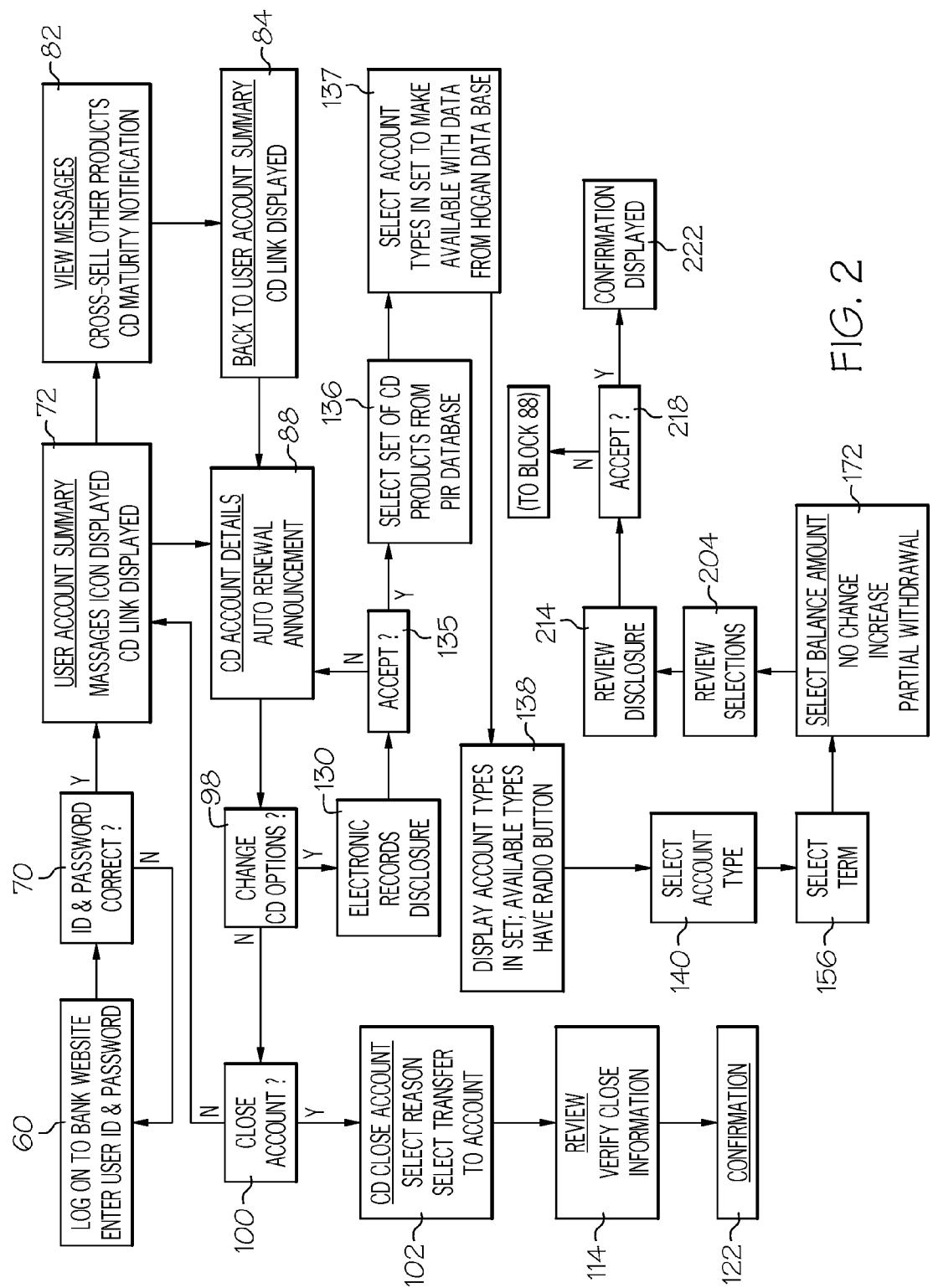
FIG. 2 is a flowchart showing the method of the present invention.

The process of the present invention is shown in the flow chart in FIG. 2. The process begins with a customer of the financial institution utilizing the client program in his or her computer 22 (see FIG. 1) to access the Internet 26 and log on to a Website provided by the financial institution or bank, indicated in block 60. The client interface is associated with the Website. As shown in FIG. 3, a "Sign On" page 62 from that Website is displayed on the client program and includes a space 64 for entry of the customer's user ID and a space 66 for entering his or her password, both necessary to identify the customer and allow the customer to proceed. This information is stored in the application data base 52 and is accessed through the mainframe 46 by an application server 36 through ECI gateway server 44, using CICS commands to the mainframe 46. The customer is requested to submit the information entered in spaces 64, 66 by using submit/cancel button commands 68, shown in FIG. 3. This information is compared with the information stored in application data base 52 and, if correct, the software in application server 36 initiates a session.

As shown in FIG. 2, at block 70, if the identification and password are correct, an "Account Summary" page is displayed on the client program, as indicated in block 72 and as shown in FIG. 4 as page 74. Otherwise, if either the identification or password is incorrect, as indicated in block 70 in FIG. 2, the user is given a generic error message and directed back to Sign On page 62 at FIG. 3.

As shown in FIG. 4, the Account Summary page 74 displays information regarding all of a customer's accounts at the particular financial institution. This information is also obtained from the mainframe 46 and various data bases, including Hogan data base 50 and current day transaction data base 48 through an application server 36 using CICS commands to mainframe 46. In addition, the application server 36 generates an indication, at 76, that the customer has messages. As shown in FIG. 5, the "View Messages" page 78 includes a message at 80 indicating that a particular certificate of deposit has reached its maturity date and informs the customer that he or she may make changes to the certificate of deposit or close it. This message is generated in response to a CICS inquiry to the Hogan data base 50 (see FIG. 1), which provides data regarding the certificate of deposit accounts of the customer, including amounts, maturity dates and renewal grace periods. The system of the invention also will determine whether a customer has another account into which the funds from the CD can be deposited if that customer elects to close the CD. If no such accounts are available, the system of the present invention will not allow the customer to close the CD. If a CD is in its renewal grace period (typically a ten-day period from the maturity date), an application server 36 generates the message 80 on page 78 and message 92 on page 90 (see below in reference to FIG. 6). The customer is then directed back to the Account Summary page 74 (FIG. 4). This step is indicated in block 82 in FIG. 2.

As indicated in block 84, the customer returns to the Account Summary Page 74 (FIG. 4) and activates the hypertext link 86 named "Key Certificate of Deposit." As indicated in block 88 in FIG. 2, the customer is taken to a "Certificate of Deposit Account Details" page 90 shown in FIG. 6. Page 90 includes a notice 92 that the customer's certificate of deposit has matured, has been renewed automatically and invites the customer to change the options or close the account if the customer does not want the CD renewed. Preferably, the CD is renewed automatically after the close of business on the maturity date of the CD. However, if the customer were to attempt to view the CD before the financial institution has renewed it, the application of the invention will force the CD to renew upon the display of the Certificate of Deposit Account Details page 90.

The page 90 includes a "CHANGE CD OPTIONS" command button 94 and a "CLOSE ACCOUNT" command button 96. This option is indicated in block 98 of FIG. 2. In response to activation of button 96, the system of the present invention sends an inquiry to the Hogan data base 50 to check for holds or restraints on the CD and to retrieve closing balance information. If, as stated previously, the customer has no accounts to which funds from the matured CD can be transferred, the CLOSE ACCOUNT command button will not be active. As indicated in block 100 of FIG. 2, if the customer elects to close the account by activating the CLOSE ACCOUNT command button 96, as indicated at block 102, the customer is taken to a "CD Close Account" page 104, shown in FIG. 7. On the CD Close Account page 104, the customer is presented with a pull-down menu 106 of reasons for closing the account (e.g., "funds are needed") and a pull-down menu 108 of all the customer's other financial accounts to which funds may be transferred, such as a savings account, checking account and the like. Such accounts also would be displayed in the Account Summary page 74 shown in FIG. 4. Once the customer has indicated the reason for closing the account and selected an appropriate account to which to transfer funds, the customer activates the CONTINUE command button 110 to continue the close process. In the alternative, the customer can cancel out of the process by activating the CANCEL command button 112.

Figure 8:
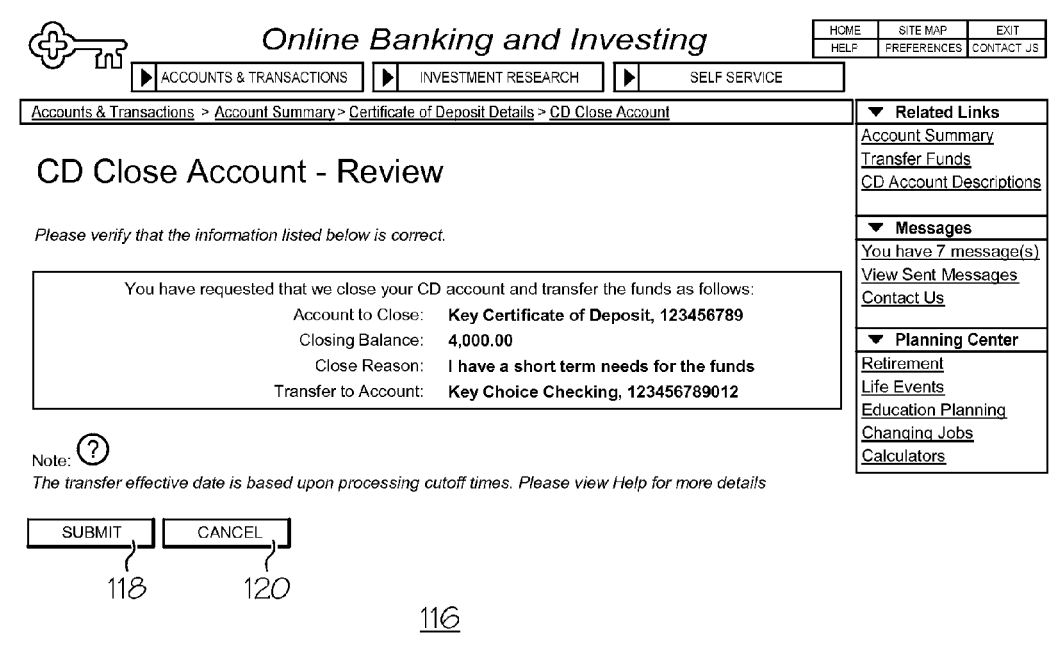
Figure 9:
FIG. 9 shows a "CD Close Account-Confirmation" page of the present invention.

As indicated in block 114 in FIG. 2, if the customer continues, the customer is taken to page 116 shown in FIG. 8 entitled "CD Close Account—Review" that displays the information relating to the certificate of deposit account to be closed, the reason for closing the account and the account to which the funds are to be transferred. The customer then activates the SUBMIT command button 118 to continue with the transaction, or in the alternative, may activate the CANCEL command button 120. As shown in FIG. 9 and indicated in block 122 in FIG. 2, the customer, having activated the SUBMIT button 118 (FIG. 8), is taken to the "CD Close Account-Confirmation" page 124. That page 124 displays the information shown on page 116 of FIG. 8 plus a confirmation number 126. The customer is asked to continue by activating the CONTINUE command button 128 that then takes the customer back to the "Account Summary" page 74 of FIG. 4. When the customer activates command button 118, the system of the present invention executes the CD close function that generates the confirmation number, submits a request to process the close in the Hogan data base 50 and submits a request to credit the selected amount in the current day transaction data base 48 (FIG. 1). The system of the present invention also logs the event for audit purposes.

In the alternative, as shown in FIG. 6, if the customer elects to change to a different CD, he or she activates the "CHANGE CD OPTIONS" command button 94. In response to activation of command button 94, the system logs an audit event (i.e., makes a record of the time of day, activity, customer and so on) and sends an account inquiry to the Hogan data base 50 (FIG. 1) to determine if there are any restrictions on the CD and if the Hogan data base is available for use in performing the renegotiation process. As indicated in block 130 of FIG. 2, the customer is then taken to page 132 where the customer is shown the appropriate disclosure documents. Page 132, shown in FIG. 10 and entitled "Change CD Options—Electronic Records Disclosure" displays an electronic records disclosure document appropriate for renegotiating a certificate of deposit. The document resides on application servers 36.

All of the information regarding the customer's financial accounts is contained in the Hogan data base 50. The rate and term information regarding the various certificate of deposit products of FIGS. 11 and 12 is contained in the PIR data base 38 that is accessed by application servers 36. When the customer activates the "CHANGE CD OPTIONS" command button 94, information regarding the CD products offered by the financial institution is copied from the PIR data base 42 to the session data base 38.

The "Change CD Options—Electronic Records Disclosure" page 132 of FIG. 10 requests the user to activate the ACCEPT command button 133 or DECLINE command button 134. If the ACCEPT command button 134 is activated, as shown in block 135 in FIG. 2, the system of the invention then selects a set of CD products from among sets of CD products stored in the PIR data base 42 appropriate for the CD to be renegotiated, as shown in block 136. For example, if the CD to be renegotiated requires a minimum opening balance of $100,000 or more, a first set of CD products is retrieved from PIR data base 42. That set may include various account types of CD's having a minimum opening balance of $100,000, a minimum opening balance of $125,000 and so on. However, if the CD to be renegotiated has a minimum opening balance of less than $ 100,000, a second set of CD products is retrieved from PIR data base 42. That set may include the various account types of CD's shown in FIG. 11. Information is displayed on the page shown in FIG. 11 by the system of the present invention requesting terms, rates and APY's for the account types from the PIR data base 42.

Next, as shown in block 137, the system of the present invention determines from the Hogan data base 50 which other accounts the customer has at the financial institution, and from that information may make certain of the CD account types in the selected set of account types unavailable for selection by the customer. As shown in block 138 and in FIG. 11, the set of available CD account types is displayed on "Change CD Options—Select Account Type" page 142, along with details 143 of the automatically renewed CD. Page 142 includes a list of products ("Account Type") in column 144, the qualifications for each product in column 146, the term range of each product in column 148 and the interest rate range and APY range in column 150. Page 142 includes a "Progress Indicator" box 151 that contains links that enable a customer to navigate to previous steps in the process.

On the far left, column 152 includes radio buttons that enable the customer to select which product he or she wishes to obtain. In this example, in box 154 the application software has determined from an inspection of the customer accounts in Hogan data base 50 that the customer is not eligible for the "Key Freedom CD" account because the customer does not meet the listed qualification of having "An active Key qualified checking account," and accordingly, a radio button is not made available to the customer for that account type. Rather, the words "Not Eligible" appear in place of the radio button. The application software determines, based upon the customer data in Hogan data base 50, which listed products to make available. Accordingly, the account types displayed on page 142 of FIG. 11 have been filtered by the system of the present invention so that only those account types that are appropriate for the particular customer, based upon that customer's account information, may be selected.

Once the customer has selected an account type by activating a radio button in column 152 of page 142, as indicated in block 156 of FIG. 2, the customer is directed to page 158, shown in FIG. 12, which displays the various terms available for the selected product. Page 158, entitled "Change CD Options—Select Term," displays a table in which column 160 lists the terms, columns 162 display the interest rate range and APY range, respectively, and columns 164 display the minimum and maximum balances corresponding to each interest rate and APY within each term. The customer is then required to enter a term in box 166 and indicate whether that number entered represents days, months or years in pull-down menu 168. The customer then activates the CONTINUE command button 170 at which point the customer is requested to select a balance amount, as indicated in block 172 of FIG. 2.

This information is requested on page 174, shown in FIG. 13 and is entitled "Change CD Options—Select Balance Amount." In box 176, the information selected on previous pages, namely, the account type, term, interest rate, annual percentage yield, minimum opening balance and maximum balance, is displayed. In box 178 the customer is asked to select an amount. The customer has three choices, each having its own respective radio button: "No balance amount changes" 180, "Additional Deposit" 182, and "Partial Withdrawal" 184. With the "Additional Deposit" 182 option, the customer is asked to select from a pull-down menu at 186 the account from which funds are to be drawn and, in window 188, to enter the amount. Similarly, with the "Partial Withdrawal" 184 option, the customer is asked to select from a pull-down menu 190 the account to which funds are to be deposited from the old certificate of deposit and to enter the amount in window 200. The customer then continues by activating the CONTINUE command button 202. However, if the customer does not have a deposit-eligible account at the financial institution, page 174 is not displayed; rather, the customer is directed directly to page 206 displayed in FIG. 14.

Figure 14:
FIG. 14 shows a page of the present invention that provides a review of selections chosen by a customer.

As indicated in block 204 in FIG. 2, once the customer has selected the amount to be invested in the CD, the customer is then taken to page 206, shown in FIG. 14, on which the selections regarding the renegotiated CD are shown in box 208. Page 206, entitled "Change CD Options—Review Selections" does not complete the process, but merely displays all of the options selected by the customer in the previously described pages. The system of the present invention also sends an HREN request to the Hogan data base 50 and compares the product, rate and term retrieved from that data base for that account type to the information selected by the customer to verify the accuracy of the selected information. If the data match, the process continues; if it does not, the process is terminated.

If the customer approves of these selections, he or she activates the "SUBMIT" command button 210 and then is taken to page 212, shown in FIG. 15 and indicated at block 214 in FIG. 2. This page, entitled "Change CD Options—Review Disclosure," displays the disclosure information relating to the selected CD product with all of the selected information contained in it, such as the term, interest rate, annual percentage yield, interest payment options and early withdrawal penalties. The customer is asked to indicate acceptance by activating the "ACCEPT" command button 216, shown at block 128 in FIG. 2. Also as shown in FIG. 2, if the customer elects not to accept, by activating the "DECLINE" command button 218, the customer is then taken back to the "Certificate of Deposit Account Details" page 90 in FIG. 6.

Figure 16:
FIG. 16 shows a page of the present invention that displays the confirmation of the renewal of the financial instrument selected by a customer.

However, if the customer elects to accept the terms set forth in block 208, the customer is directed to page 220, shown at FIG. 16 and indicated in block 222 in FIG. 2. Page 220, entitled "Change CD Options—Confirmation," displays in box 224 a receipt including a confirmation number 226 and a summary of the entire transaction. The customer can print this page for his or her records using printer 24 (see FIG. 1). Once this transaction has been completed, the information is stored in the current day transaction data base 48 and, at the end of the business day, that data base of financial information will be used to update the Hogan data base 50. In addition, the system also logs an appropriate audit event for the completed renegotiation (i.e., no balance change, partial withdrawal or additional deposit).

As set forth above, the present invention provides a user-friendly, Web-accessible system that enables the customers of a financial institution to access their accounts at the financial institution and renegotiate a financial instrument such as a certificate of deposit. Moreover, this system is entirely automated and does not require the execution of printed documents or intervention of personnel of the financial institution.

While the method and system herein described constitute preferred embodiments of this invention, it is to be understood that the invention is not limited to this precise system and method, and that changes may be made therein without departing from the scope of the invention.

What is claimed is:

1. A method for renegotiating a financial instrument comprising the steps of:
    initiating a logical session between a client program and a client interface affiliated with a financial institution; and
    during said logical session,
        displaying financial information relating to a client on said client interface,
        displaying a message on said client interface that a first financial instrument of said client can be renegotiated,
        transmitting from said client program a request to renegotiate said first financial instrument to said client interface,
        displaying an electronic records disclosure agreement pertaining to said request to renegotiate said first financial instrument, wherein said disclosure agreement includes terms in which said client is asked to consent to use of electronic records in renegotiating said first financial instrument,
        upon receipt of acceptance of said terms of said disclosure agreement from said client program to said client interface, displaying a plurality of renegotiation options on said client interface, said plurality of renegotiation options each including a minimum balance and associated time term range and rate of return range, and disabling from selection by said client at least one renegotiation option based upon a balance of said first financial instrument,
        transmitting from said client program a selection of one of said plurality of renegotiation options to said client interface, including specifying a balance amount and a time term,
        transmitting from said client interface to said client program said selected renegotiation option and displaying at said client program said specified balance amount and time term and an associated rate of return, and
        transmitting from said client program to said client interface acceptance of said renegotiation option, whereby said financial instrument renegotiation is completed electronically during said logical session such that said rate of return is fixed during said logical session and said financial institution does not need a printed document signed by said client agreeing to said renegotiation.

2. The method of claim 1 wherein said step of transmitting a selection of one of said renegotiation options includes subsequent steps of displaying agreement and disclosure information pertaining to terms of a renegotiated financial instrument; and transmitting acceptance of said agreement and disclosure information to said client interface.

3. The method of claim 1 wherein said initiating step includes a step of transmitting identification information pertaining to a client from said client program to said client interface.

4. The method of claim 1 wherein said step of displaying an option of selecting a balance amount of said financial instrument includes a step of selecting from among options of (i) a balance that is the same as a previously obtained financial instrument of similar kind that has expired, (ii) an increased balance relative to said previously obtained financial instrument of similar kind that has expired and (iii) effecting a partial withdrawal of said balance of said previously obtained financial instrument of similar kind that has expired.

5. The method of claim 4 wherein said financial instrument is a certificate of deposit.

6. The method of claim 5 wherein said step of displaying an option of selecting a balance amount includes a step of selecting an account type.

7. The method of claim 1 wherein said step of displaying a plurality of renegotiation options includes an initial step of selecting said plurality of renegotiation options from among a plurality of sets of renegotiation options, each of said sets being associated with a particular financial instrument, said selected set being associated with said financial instrument of said client.

8. The method of claim 1 wherein said step of displaying a plurality of renegotiation options includes an initial step of reviewing other financial accounts of said client and disabling from selection those options for which said client does not qualify based upon said review.

9. The method of claim 1 further comprising the step of displaying said selection on said client interface to enable said client to review said selection.

10. The method of claim 1 further comprising the step of displaying disclosure documentation specific to said selection on said client interface.

11. The method of claim 10 further comprising the step of requesting an indication of acceptance of said disclosure documentation from said client.

12. The method of claim 11 further comprising the step of displaying confirmation of acceptance of said disclosure on said client interface.

13. The method of claim 12 wherein said step of displaying confirmation of acceptance of said disclosure includes displaying a supplemental renewal receipt.

14. The method of claim 1 further comprising the step of transmitting to said client interface an election to close said financial instrument in the event that said client elects not to renegotiate said financial instrument.

15. The method of claim 14 further comprising the step of requesting said client to select a financial account to which to transfer funds from said closed financial instrument.

16. The method of claim 15 further comprising the step of selecting from among a plurality of financial accounts said financial account to which to transfer funds, and transmitting said selection to said client interface.

17. The method of claim 16 further comprising the step of displaying a summary of information pertaining to said closed financial instrument and said selected financial account.

18. The method of claim 17 further comprising the step of requesting confirmation of a transaction embodied in said summary.

19. The method of claim 18 further comprising the step of transmitting confirmation of said transaction to said client.

20. A system for renegotiating a financial instrument over a network comprising:
a computer-readable medium containing a client interface program affiliated with a financial institution and configured to (i) initiate a logical session with a client program and exchange data therewith and (ii) send financial information to and retrieving financial information from a legacy system of said financial institution having a customer data repository;
an application server housing said computer-readable medium and being connected to establish a logical session with a client program such that financial information relating to a client is displayed on a display device associated with said client program;
said client interface program being configured, during said logical session, to
retrieving retrieve data from said data repository that a financial instrument of said client may be renegotiated and display a message on said display device indicating that said financial instrument may be renegotiated,
communicate with said client program to solicit and receive soliciting and receiving a request to renegotiate said financial instrument from said client,
display terms of an electronic records disclosure agreement in response to said request to renegotiate, wherein said client consents to use of electronic records in renegotiating said financial instrument pertaining to said request to renegotiate and requesting said client to assent to terms thereof,
upon receipt of acceptance of terms of said electronic records disclosure agreement, display a plurality of renegotiation options to said clients said plurality of renegotiation options each including a minimum balance amount and associated time term range and rate of return range, and disable from selection by said client at least one renegotiation option based upon a balance of said first financial instrument,
receive from said client program a selection of one of said renegotiation options from said client, including specifying a balance amount and a time term,
display at said client program, in response to said selection, said specified balance amount and time term and an associated rate of return, and
receive from said client program an acceptance of said selected renegotiation option, whereby said financial instrument renegotiation is completed electronically during said logical session such that said rate of return is fixed during said logical session and said financial institution does not need a printed document signed by said customer agreeing to said renegotiation.

21. The system of claim 20 wherein said application server includes a data base having sets of different renegotiation options, each of said sets being associated with a financial instrument, whereby said client interface program is capable of selecting for display said set of renegotiation options associated with said financial instrument to be renegotiated.

22. The system of claim 20 wherein said client interface program is capable of retrieving information regarding a client's financial accounts from said customer data repository and disabling from selection those options for which said client does not qualify based upon said accounts.

23. The system of claim 20 wherein said client interface program is capable of receiving a transmitted acceptance of said disclosure document terms to said client program.

24. The system of claim 20 wherein said client interface program is capable of receiving identification information pertaining to a client from said client program.

25. The method of claim 24 wherein said client interface program is capable of displaying an option of selecting a balance amount from among options of (i) the same balance as a previously obtained financial instrument of similar kind that has expired, (ii) an increased balance relative to said previously obtained financial instrument of similar kind that has expired and (iii) effecting a partial withdrawal of said balance of said previously obtained financial instrument of similar kind that has expired.

26. The method of claim 20 wherein said financial instrument is a certificate of deposit.

27. The method of claim 26 wherein said client interface program is capable of displaying an option of selecting an account type.

28. The method of claim 27 wherein said step of displaying an option of selecting a balance amount includes the step of selecting a term.

29. The system of claim 20 wherein said client interface program is capable of displaying said selection on said client interface to enable said client to review said selection.

30. The system of claim 20 wherein said client interface program is capable of displaying disclosure documentation specific to said selection on said client interface.

31. The system of claim 30 wherein said client interface program is capable of requesting an indication of acceptance of said disclosure documentation from said client.

32. The system of claim 31 wherein said client interface program is capable of displaying confirmation of acceptance of said disclosure on said client interface.

33. The system of claim 32 wherein said client interface program is capable of displaying a supplemental renewal receipt.

34. The system of claim 20 wherein said client interface program is capable of closing said financial instrument in the event that said client elects not to renegotiate said financial instrument.

35. The system of claim 34 wherein said client interface program is capable of requesting said client to select a financial account to which to transfer funds from said closed financial instrument.

36. The system of claim 33 wherein said client interface program is capable of selecting from among a plurality of financial accounts said financial account to which to transfer funds.

37. The system of claim 34 wherein said client interface program is capable of displaying a summary of information pertaining to said closed financial instrument and said selected financial account.

38. The system of claim 35 wherein said client interface program is capable of requesting confirmation of a transaction embodied in said summary.

39. The system of claim 36 wherein said client interface program is capable of confirming said transaction.

* * * * *